United States Patent

[11] 3,630,841

| [72] | Inventors | Eugen Werle;<br>Hans Fritz, both of Munich, Germany |
| --- | --- | --- |
| [21] | Appl. No. | 826 |
| [22] | Filed | Jan. 5, 1970<br>Continuation-in-part of Ser. No. 636,612, May 8, 1967, abandoned |
| [45] | Patented | Dec. 28, 1971 |
| [73] | Assignee | Farbenfabriken Bayer Aktiengesellschaft Leverkusen, Germany |
| [32] | Priority | May 26, 1966 |
| [33] | | Germany |
| [31] | | F 49 298 |

[54] PURIFICATION OF ENZYME INHIBITORS
11 Claims, No Drawings

[52] U.S. Cl. .................................................. 195/2,
195/4, 195/66 R, 195/DIG. 11, 260/112 R

[51] Int. Cl. .................................................................. C07g 7/00
[50] Field of Search .............................................. 195/2, 4,
66; 260/112

[56] References Cited
UNITED STATES PATENTS
3,558,773  1/1971  Schultz ........................ 424/177

*Primary Examiner*—Lionel M. Shapiro
*Attorney*—McCarthy, Depaoli, O'Brien & Price

ABSTRACT: This document discloses a method for purification, including concentration, of certain enzyme inhibitors. The inhibitors are sorbed from their aqueous solutions by an insoluble material which is a combination of a polymeric substance and an enzyme, and subsequently are desorbed.

PURIFICATION OF ENZYME INHIBITORS

This application is a continuation-in-part of our application Ser. No. 636,612, filed May 8, 1967 now abandoned.

This invention relates to a method for purifying and/or increasing the concentration of certain enzyme inhibitors. These inhibitors include trypsin inhibitor, kallikrein inhibitor, Kunitz inhibitor and the like, and may be described, as a class, by the term proteolytic enzyme (protease) inhibitors.

Proteolytic enzymes themselves function to hydrolyze proteins in the body. Trypsin and chymotrypsin are well-known enzymes which normally operate within the digestive system and digest proteins. Kallikrien is a substance found in the bodies of mammals, which, it has been found, serves to dilate the peripheral arterial vessels, and the mechanism by which kallikrein does this has been found to be a proteolytic process.

Trypsin inhibitor, kallikrein inhibitor and Kunitz inhibitor are substances different from these enzymes which, however, appear to be quite similar to each other in that each of them can inhibit the activity of some or all of the enzymes described above. Trypsin inhibitor may be obtained from some vegetable materials such as husks of grain seeds, wheat germ and rice germ. Another trypsin inhibitor was found in spermatocysts of mice (H. Haendle et al., Z. physiol. Chem. 343, 185 (1965)). It is a basic polypeptide with a molecular weight of 6,800. Besides trypsin the enzyme plasmin is inhibited.

Another trypsin inhibitor was isolated from pig pancreas glands. This inhibitor is also a basic polypeptide with a molecular weight of 5,703. It inhibits trypsin and to a low degree papain. (H. Fritz et al., Z. physiol. Chem. 345, 168 (1966), H. Tschesche, Z. physiol. Chem. 348, 1216 (1967)).

The Kunitz inhibitor is a basic polypeptid substance originally obtained from bovine pancreas (Kunitz, M., and Northrop, J.H., J. Gen. Physiol. 19, 991 (1936)). Some of its properties are described, for example, in an article by F. Guerrin et al. in Compt. Rendus Soc. Biol. 159, (5), 1,172–4 (1965). This inhibitor is identical with the previously described kallikrein inhibitor by Kraut, H., Frey, E. K. und Werle, E.: Z. physiol Chem. 192, 1 (1930), and later Werle, E.: Z. physiol. Chem 338, 228 (1964) as shown by Anderer, E.: Z. Naturf. 2ob. 462 (1965). The polypeptide has a molecular weight of 6,500 and inhibits kallikrein, trypsin, chymotrypsin and plasmin (fibrinolysin). It has been prepared by extracting certain dried bovine organs with water or dilute acetic acid. Such organs include the lymph glands and the parotid glands as well as the lung, pancreas, liver and spleen. Kallikrein inhibitor is useful in certain control, preventative, preoperative and/or postoperative treatments of certain diseases where body organs themselves are attached by protein-splitting enzymes. Such a disease is acute pancreatitis, wherein the pancreas itself is attacked, apparently by the digestive enzymes which it produces. The use of KI in therapy is discussed in the literature, for example, by R. Bedacht in Arztl. Prax., 12, 371 (1958); J. Kirsch in Med. Welt (1960), page 2719; and K Veiel in Clinical Excerpts, 22, (1) (1961), published by Farbenfabriken Bayer AG, Leverkusen, Germany.

The kallikrein inhibitor has been isolated from the animal organ extracts by precipitating the inhibitor from the extracts with ethanol (F. F. Hoppe-Seylers in Z. Physiol. Chem., 192, 1 (1930). The further purification is a process which contains many steps and involves considerable loss of material. The purification according to the invention, however, avoids these steps with their losses.

It has been shown that certain proteolytic enzymes, namely trypsin and chymotrypsin can combine with ethylene-maleic anhydride copolymer (EMA) to form stable water-insoluble gel or flakelike materials which maintain their enzymatic activity. See the article by Levin et al. in Biochemistry 3 (1964) pages 1,905–1,913. This article proposes that in the resulting combined material the enzyme molecule is present as cross-links between adjacent copolymer molecules. Also, this article points out that the enzymatic activity of the combined material may be inhibited by the use of known inhibitors.

This invention is based on the discoveries that kallikrein as well as other proteolytic enzymes may be brought into combination with EMA; that certain polymers other than EMA may also be employed; that the polymer-enzyme combination will serve to sorb certain enzyme inactivators from a solution; and that the enzyme inactivator may be desorbed from the polymer-enzyme combination to provide a concentrated solution of the purified inhibitor. It has been found that a polymer-trypsin combination will sorb any of the inhibitors mentioned above, that polymer-chymotrypsin combination will sorb kallikrein inhibitor (Kunitz inhibitor) and that a polymer-kallikrein combination will sorb kallikrein inhibitor.

The insoluble and soluble carriers to be used according to this invention are, as mentioned, chiefly polymeric substances. These substances must contain functional groups which are capable of reacting according to the methods of peptide chemistry with the said proteolytic enzymes. They primarily include those resins which contain side-chains having anhydride groups, acid chloride groups, isocyanate groups and azid groups, and also those resins which contain activated fluorine atoms. See Makromolekular-Chemie 39 (1960) page 13, or Ann. Rev. Biochem. 35 (1966) page 873. The known, commercially available, carboxyl-containing ion exchanger resins can also be used after the addition thereto of polyfunctional materials which can react with the resin and still provide sites for combination with the enzyme. Some water-soluble resins also may be employed, since combination with the enzyme will often serve to make the combination water-insoluble. Also, a soluble kallikrein-polymer combination has been found usable to sorb kallikrein-inhibitor from serum.

The purification and/or concentration process of this invention may be carried out by manipulations typical of sorption-type processes; for example, the polymer-enzyme combination material may be packed into a column, perhaps after mixture with an inert diluent material such as cellulose powder. The inhibitor, in aqueous solution, may be passed through the column and the column thoroughly washed with water and buffer solutions, in order to remove accompanying substances and impurities. Subsequently, the inhibitor is desorbed by shifting the pH and/or modifying the ion concentration and/or by displacement by means of competitive inhibitors or enzymes, for example, tryptamine, n-butyl-amine or epsilon-amino caproic acid for trypsin, and/or by the addition of substances, such as urea, which are capable of loosening or dissolving molecular interactions, possibly by a reversible denaturation of the proteins concerned.

The process according to this invention has the advantage of making it possible to enrich, purify and isolate, in a simple manner and with good yields and degrees of purity, the inhibitors for kallikrein and other proteolytic enzymes, enrichment of which from impure solutions has hitherto been difficult and expensive.

The invention will be better understood by reference to the following examples, which are to be considered illustrative only and not limiting. In the examples, EMA is the DX 840 ethylene-maleic anhydride copolymer described on page 1906 of the above-mentioned Levin et al. article. The buffer employed was a 0.2 M aqueous potassium phosphate solution having a pH of about 7.5. All the inhibitors were one prepared by dealbuminating a tissue homogenate with perchloric acid or ethanol, concentrating the resulting supernatant liquid in a vacuum and adjusting to pH 7.8 by means of the above buffer.

EXAMPLE I

A water insoluble trypsin-EMA combination is made by a procedure analogous to that described in the above-mentioned Levin et al. article. Five grams of trypsin dissolved in 500 ml. of 0.2 M potassium phosphate buffer at pH 7.5 is suspended with 1 gram of EMA in 1 litre of the above buffer and mixed with 100 ml. of 0.1 percent aqueous solution of hexamethylene diamine. When the reaction is completed, the product is mixed with twice its volume of slurried cellulose powder and poured into a column. This column is washed with a 0.1 M triethanol-amine buffer at pH 7.8 containing also 0.1 M NaCl and 0.1 M CaCl$_2$, until active trypsin no longer appears in the effluent. All these operations are carried out with cooling (4°C).

Trypsin inhibitor solution prepared from spermatocysts of mice was prepared according to Haendle et al., Z. physiol. Chem. 343, 185 (1965). The glands were homogenized and the protein precipitated by the addition of perchloric acid. After neutralisation with potassium carbonate and centrifugation, the supernatant extract was directly applied to the column of EMA-trypsin combination. The column could sorb an amount of inhibitor capable of inhibiting about 1 gram trypsin. After the inhibitor solution has passed through the column, this is washed with buffer and water until free from protein. The inhibitor is subsequently eluted again from the column with a HCl/KCl buffer (0.2N KCl at pH 2. A yield of about 75 percent of the trypsin inhibitor was recovered in the effluent.

After adjusting the pH value of 7.8 the column can be used for the next purifying operation. If the operations are carried out with cooling (4° C. water), the column can be used for isolating inhibitors over several months without any noticeable loss of capacity.

EXAMPLE II

A crude solution of inhibitor and other protein material derived from pig pancreas according to the process of H. Fritz et al., Z. physiol. Chem. 345, 150 (1966) was purified by passage thru the EMA-trypsin column described in Example I. The resulting concentrate was substantially free from accompanying proteins (spec. activity 2.8 mU/mg. protein). The yield is about 80 percent provided the purification is carried out at 4°-8° C. After concentration, the acidic inhibitor solution (pH 2.0) is desalted by passage thru a deionizing resin (Sephadex G-25) and lyophilized.

EXAMPLE III

Kallikrein inhibitor obtained from ox lungs and livers was also purified by passage thru the EMA-trypsin column of example I and subsequent desorption. A yield of 90-100 percent purified KI was obtained by elution at pH 2.0.

EXAMPLE IV

A trypsin-resin complex was prepared by slurrying 500 mg. EMA and 250 mg. trypsin (183 U), and the supernatant liquid was centrifuged off. The trypsin-EMA resin combination was washed on the centrifuge five times with 0.05 M phosphate buffer at pH 7.0 and five times with 0.1 M potassium chloride. The wash water was then free from any tryptic activity. The combined supernatant and wash liquids had a tryspin activity of 10 U. About 95 percent of the trypsin used was thus linked to the resin.

The resin was then mixed at pH 7.0, while cooling with ice, with 2.12 ml. of a crude dealbuminated solution of the inhibitor obtained from pig pancreas, said solution containing 18.7 U inhibitor (specific activity 55 mU/mg. protein according to Waddell). After stirring for 5 minutes, the mixture was centrifuged and the residue washed 5 times on the centrifuge with 0.1 M sodium chloride solution. The combined liquids exhibited no trypsin inhibition.

The residue was then suspended in an ice bath with 0.1 M sodium chloride solution and adjusted to pH 2.0 with 50 ml. of 0.1 N hydrochloric acid. The mixture was centrifuged and the residue again washed on the centrifuge with 150 ml. of 0.1 M sodium chloride/0.1 N HCl at pH 2.0. The combined liquids had an inhibition effect of 11.9 U, i.e. 61 percent of the inhibitor used. The specific inhibition effect amounted to 900 mU/mg. protein according to Waddell. The enrichment thus was sixteenfold. The resin combination could be used again.

EXAMPLE V 0.4 Grams of a maleic anhydride-vinylpyrrolidone compolymer (containing 53 percent vinylpyrrolidone) were reacted as in Example I with 2.0 g. trypsin (1168 U) and placed in a column together with cellulose powder. The column was charged with 163 U of a crude inhibitor solution obtained from pig pancreas, washed and eluted with a solution of 0.1 M hydrochloric acid and 0.1 M hydrochloric acid and 0.1 M sodium chloride. The yield of inhibitor was 99 U, i.e. 61 percent of the amount used.

EXAMPLE VI

A copolymer of methacrylic acid and methacrylic acid-3-fluoro-anilide according to Manecke (Makromolekular-Chemie, 39, 13, (1960)) suspended in 0.1 M bicarbonate buffer was reacted at 4° C. with trypsin. The resultant resin combination was mixed with cellulose powder, placed in a column and eluted at 4° C. with 0.1 M triethanolamine-buffer at pH 7.8, until trypsin could no longer be detected in the effluent. This column was then charged at pH 7.8 with an impure solution of the inhibitor from pig pancreas and washed with 0.1 M triethanolamine-buffer at pH 7.8 until the inhibitor could no longer be detected in the effluent. The inhibitor sorbed on the column was then eluted with a solution of 0.1 M HCl in 0.1 M NaCl.

EXAMPLE VII 200 mg. EMA are briefly homogenized at 0° C. in 200 ml. of buffer and stirred with 20 ml. of 0.1 percent hexamethylene diamine solution for 3 minutes. 1 Gram alpha-chymotrypsin, dissolved in 100 ml. of 0.2 M phosphate buffer at pH 7.5, is added and the mixture is stirred to 0°-4° C. overnight, the pH of the solution being maintained at 7.5 by adding buffer, if necessary.

The precipitate is washed (centrifuged) several times with a triethanolamine buffer solution at pH 7.8 (0.1 M triethanolamine, 0.1 M NaCl, 0.01 M CaCl$_2$), then stirred with 3 times its volume of cellulose powder and poured into a column which is cooled with water. The column is washed with the same buffer for about 6 hours.

50,000 KIU of kallikrein inhibitor, dissolved in the above buffer at pH 7.8, were completely adsorbed on the column. Elution of the kallikrein inhibitor was quantitative with 0.25 M KCl/HCl buffer at pH 2.0.

EXAMPLE VIII

An extract from bovine pancreas was dealbuminized with perchloric acid and desalted through the deionizing resin described above. The resulting crude extract contained about 200,000 ml. of trypsin inactivating substance of which about 50 percent were also inhibiting kallikrein (Kunitz inhibitor). After the addition of NaCl (0.2 M) and of a buffer at pH 8.0, the extract was applied to the EMA-chymotrypsin column described in Example VII. In the fraction which passes through the column, 100,000 ImU of inhibitor were found, of which less than 1 percent was due to the presence of the Kunitz inhibitor, the remainder being trypsin inhibitor. This fraction from the EMA-chymotrypsin column was subsequently passed through the EMA-trypsin column of example I. Each inhibitor was obtained from its respective column by elution with an acid solution. Thus, with the aid of this process it is possible to achieve an almost quantitative separation and purification of the Kunitz inhibitor and the specific trypsin inhibitor, since the effluent of the EMA-chymotrypsin column may be directly applied to the trypsin column.

EXAMPLE IX 400 mg. of EMA were briefly homogenized at 0° C. in 200 ml. of 0.2 M phosphate buffer at pH 7.5. The mixture was treated with 2 ml. of a 1 percent hexamethylene diamine solution and stirred at 0° C. for 3 minutes. 100,000 kallikrein units (2 γprotein/KU), dissolved in 20 ml. of 0.2 M phosphate buffer at pH 7.5, were then added and the suspension was stirred at 0°–4° C. overnight. The EMA-kallikrein (99,500 KU were linked to EMA) was mixed with about four times its volume of cellulose powder and the mixture was poured into a column which was cooled with water and charged with a layer of Sephadex G–25 of about 1 cm. height.

After washing this EMA-kallikrein column with 0.1 M triethanolamine buffer (+ 0.2 M NaCl) at pH 7.8, 75,000 KIU of the 60,000 KIU kallikrein inhibitor applied were sorbed in the column, 40,000 KIU were eluted with ammonium acetate buffer at pH 2. At a pH of about 3.5 only a 30 percent yield is obtained. With smaller columns, the yield of eluted kallikrein inhibitor can amount to 100 percent. The EMA-kallikrein column could be recharged at pH 7.8 with kallikrein inhibitor, that is to say that the bound kallikrein was not damaged by the elution buffer at pH 2. The kallikrein inhibitor can also be eluted from the EMA-kallikrein column at about neutral (pH 6.0) with the aid of an 8 M urea solution (+ 0.1 M triethanolamine buffer at pH 7.8). In this case the yield of kallikrein inhibitor (after separating the urea by means of a Sephadex G–25 column) amounts up to 100 percent. It can be assumed that a reversible denaturation of the kallikrein inhibitor and thus a splitting of the specific kallikrein inhibitor association occurs on the column.

What is claimed is:

1. A method for the purification of an enzyme inhibitor selected from the group consisting of trypsin inhibitor, Kunitz inhibitor and kallikrein inhibitor which comprises contacting a less pure aqueous solution of said inhibitor with an insoluble polymer-enzyme combination material, separating said combination material from the unsorbed aqueous phase and desorbing a more pure aqueous solution of said inactivator from said combination material, said combination material being formed by contact of a proteolytic enzyme, inhibitable by said inhibitor, with a polymeric material cross-linkable by said proteolytic enzyme.

2. A method according to claim 1 in which the polymeric material is an ethylene-maleic anhydride copolymer.

3. A method according to claim 1 in which the proteolytic enzyme is trypsin.

4. A method according to claim 3 in which the polymeric material is a maleic anhydride-vinylpyrrolidone copolymer.

5. A method according to claim 3 in which the polymeric material is a methacrylic acid-methacrylic acid-3-fluoroanilide copolymer.

6. A method according to claim 3 in which the inhibitor is trypsin inhibitor.

7. A method according to claim 3 in which the inhibitor is Kunitz inhibitor.

8. A method according to claim 3 in which the inhibitor is kallikrein inhibitor.

9. A method according to claim 1 in which the proteolytic enzyme is chymotrypsin and the inhibitor is Kunitz inhibitor.

10. A method according to claim 1 in which the proteolytic enzyme is chymotrypsin and the inhibitor is kallikrein inhibitor.

11. A method according to claim 1 in which the proteolytic enzyme is kallikrein and the inhibitor is kallikrein inhibitor.

* * * * *